Patented Apr. 4, 1950

2,502,606

UNITED STATES PATENT OFFICE 2,502,606

REACTING BLOWN NONDEHYDRATED CASTOR OIL WITH MALEIC ANHYDRIDE, PRODUCTS, AND COMPOSITIONS THEREOF

Harry M. Ullmann, Bethlehem, Pa.; Rachel Mifflin Ullmann executrix of said Harry M. Ullmann, deceased No Drawing. Application March 5, 1946,
Serial No. 652,229

11 Claims. (Cl. 106—176)

My invention relates to a modified castor oil product, to compositions including the same, and to the process of making the product.

A purpose of my invention is to produce a modified nondehydrated blown castor oil product, somewhat more viscous than nondehydrated blown castor oil, soluble in nondehydrated blown castor oil, readily soluble in cold turpentine, miscible with nitrocellulose, and soluble in a water solution of an alkali, which functions as a dispersing agent for various oils or waxes in water.

A further purpose is to produce an improved plasticizer, especially for use in nitrocellulose lacquers or enamels.

A further purpose is to produce a nitrocellulose plasticizer having increased miscibility with nitrocellulose through a solvent as compared with raw castor oil, and capable of use in higher proportions in nitrocellulose lacquers and lacquer-enamels as compared with raw castor oil for a given enamel hardness produced, thus cheapening the product.

A further purpose is to increase the viscosity of nondehydrated blown castor oil, especially but not exclusively when used for plasticizing nitrocellulose, while actually reducing the difficulty of mixing and especially of incorporating pigment.

A further purpose is to provide a plasticizer which will give harder lacquer films as compared with those obtained previously using raw castor oil, as for example with nitrocellulose.

A further purpose is to produce a plasticizer which will enable a formulation to hold higher pigment concentrations necessary to get a hard film or to provide adequate pigment content in the case of certain colors, while at the same time dissolving high contents of lacquer constituents such as nitrocellulose, holding the high pigment contents well dispersed and plasticizing the high contents of nitrocellulose.

A further purpose is to aid in incorporating pigment in coatings, whether or not nitrocellulose is present, using the superior wetting and dispersing properties of the products of the present invention to increase the production rate of the mixing mill, shorten the grinding time and improve the flow of the product when mixed with the pigment.

A further purpose is to minimize the gassing which has occurred in containers of nitrocellulose lacquers having alkaline pigments.

A further purpose is to raise the spew temperature of nitrocellulose formulations used on coated textiles.

A further purpose is to provide a more convenient and reliable method of incorporating basic dye into coatings by combining the dye with the acidic groups of maleic anhydride which is combined at the carbon chain with nondehydrated blown castor oil.

A further purpose is to form a dispersing agent from the soluble base salt or preferably the salt-ester of the compound formed by combining maleic anhydride at the carbon chain of nondehydrated blown castor oil, and to perform improved dispersions of oils, waxes and the like.

A further purpose is to produce an improved textile softener, cutting compound, coating, printing ink, finish or polish from nondehydrated blown castor oil converted to a polar structure.

A further purpose is to react together nondehydrated castor oil with from 2 to 20 percent of maleic anhydride, preferably from 3 to 10 percent, and most desirably from 3 to 10 percent at between 70° and 140° C., preferably between 95° and 140° C., more desirably between 105° and 120° C., and most desirably between 110° and 115° C., for a time of at least one hour and preferably not exceeding 12 hours (although in some cases 25 hours has proved desirable), desirably 2 and 6 hours, to blow to form nondehydrated blown castor oil before, during or after the reaction, and then desirably to neutralize or react the reaction product with an alkali, alcohol, metal salt, basic dye or the like.

A further purpose is to react together nondehydrated castor oil and maleic anhydride under conditions which will prevent the formation of an alkyd resin and of a rubber-like plastic, but which will beneficially modify the chemical and physical properties of the nondehydrated blown castor oil, and to blow to form modified nondehydrated blown castor oil.

Further purposes appear in the specification and in the claims.

In the prior art, several workers have reacted castor oil with maleic anhydride under various conditions in respect to character of castor oil, concentration, temperature, and time, to obtain products falling into one of the following classes:

1. Alkyds, obtained ordinarily by reacting at temperatures of 160° C. or above, usually at 250° C. or above. These materials are viscous resins. The reaction in this case of course involves the acidic group of the maleic anhydride and the hydroxyl group of the oil molecule (castor oil is hydroxylated, unless it is dehydrated).

2. Rubber-like plastics obtained from high concentrations of maleic anhydride reacting with castor oil at lower temperatures, as in Daimler German Patent 479,965.

| Grade Names | Raw | A | B | C | D |
|---|---|---|---|---|---|
| Acid value | 5-10 | 5-7 | 16-22 | 21-25 | 12-16 |
| Iodine value | 80-86 | 75-82 | 62-74 | 65-75 | 65-75 |
| Sap. value | 178-182 | 188-195 | 215-225 | 225-235 | 220-230 |
| Sp. Gr. | 0.957-0.960 | 0.975-0.985 | 1.001-1.003 | 1.01-1.03 | 1.02-1.04 |
| Gardner-Holt Viscosity | T | W | Z-1 | Z-5 | Z-6+ |

3. Castor oil has been treated at high temperature and usually with catalysts, sometimes by blowing, to dehydrate it, in which case it loses hydroxyl groups, is said to become conjugated, and undergoes the diene synthesis or Diels and Alder reaction.

By varying the reacting conditions, I have discovered that it is possible to obtain modified castor oil products which are totally different from the above classes of material, and which appear to be more closely related to the Clocker reaction products obtained with nonhydroxylated nonconjugated oils, as described in U. S. Patents 2,188,882 to 2,188,890 inclusive, and in U. S. Patent 2,275,843 in which the maleic anhydride combines with the fatty acid carbon chain at a double bond in the oil. By the technique herein described, it is possible substantially to avoid the usual alkyd reaction, notwithstanding that the maleic anhydride is acidic and the castor oil is hydroxylated.

The present invention is related to my U. S. Patent application, Serial No. 515,030, filed December 20, 1943, Patent No. 2,396,793, for Modified oil. That application deals with the product obtained from raw castor oil. The present application is concerned with the product of nondehydrated blown castor oil.

In the prior art it has been customary to dehydrate castor oil by heating at elevated temperatures, (such as 450° to 475° F.) for suitable lengths of time and in the presence of proper catalysts to dehydrate the castor oil, removing hydroxyl groups, increasing the iodine number, and, it is said, causing double bonds to shift to a conjugated relationship. Whereas raw castor oil is soluble in ethyl alcohol, ether, benzol, toluol, acetone, hot or cold turpentine, and insoluble in mineral spirits, such as V. M. and P. naptha, this dehydrated castor oil, is not soluble in ethyl alcohol, but is soluble in mineral spirits.

The practice has also grown up of producing a blown castor oil which is markedly different from dehydrated castor oil.

The blown castor oil is not dehydrated, has a lower iodine number than the raw castor oil (whereas the dehydrated oil has a much higher iodine number), retains its solubility in ethyl alcohol, ether, acetone, hot and cold turpentine, and usually in benzol and toluol, and is insoluble in mineral spirits such as V. M. and P. naptha, all like the raw castor oil. This nondehydrated blown castor oil is typically made by air blowing at an elevated temperature (such as 200° and 300° F.) for a very short time, then lowering the temperature to 160° to 180° F. and continuing to blow until the iodine numbers are from about 62 to 82 and the viscosities are from about W to Z-6+. The time at the higher temperature or the activity of the catalyst is not sufficient to dehydrate, and the oil after blowing is still nondehydrated, hydroxylated, and nonconjugated.

Typical grades of nondehydrated blown castor oil as compared with raw oil are indicated in the table below by industry grade names and properties.

Wherever reference is made herein to nondehydrated blown castor oil, it is intended to indicate a product whose iodine number is not greater than that of the original raw castor oil, and it is not intended to include in this designation castor oil which has been dehydrated by virtue of the time at elevated temperature and catalyst which have been employed.

The simplest way to obtain the product of the present invention is to react nondehydrated blown castor oil with maleic anhydride, and this will be first explained. I find, however, that I can obtain the same product by reacting the maleic anhydride with raw castor oil, and blowing during or subsequent to the reaction, as later explained.

As well known, maleic acid may be used as a source of maleic anhydride. Also, as clearly set forth in the Clocker patents above referred to, fumaric acid or citraconic acid or other materials yielding maleic anhydride may be employed.

In order to obtain the product of the invention, I react nondehydrated blown castor oil with from 2 to 20 percent of maleic anhydride at between 70° and 140° C. for at least one hour. Since the reaction between the maleic anhydride and the nondehydrated castor oil is desired, substantial quantities of other reactants which would interfere with the reaction should be avoided.

The percentage of maleic anhydride will preferably be 3 to 15 percent of the castor oil, and best results are obtained with from 3 to 10 percent. The preferred temperature is 95° to 140° C. and a temperature between 105° and 120° C. is better. The time should be preferably not exceeding 12 hours. The time of between 2 and 6 hours is preferred.

The following examples indicate various products obtained by reacting under different conditions. In all cases it will be clear that the product is not an alkyd, since the total reacted maleic anhydride in each of these examples has been determined by increase in acid number. The unreacted maleic anhydride, if any, may be readily removed by washing with hot water.

All proportions are by weight unless otherwise indicated. Viscosities are on the Gardner-Holt scale.

*Example 1*

In a flask equipped with an air condenser, nondehydrated blown castor oil having an initial Gardner-Holt viscosity of W and other properties as shown under the designation A in the above table, was stirred and heated with 10 percent of maleic anhydride at 112° to 115° C. for 4 hours. The total percentage of reacted maleic anhydride in the final product was 7.5 percent.

The product was soluble in ethyl alcohol, ether, benzol, toluol, acetone, ethyl acetate, butyl acetate, amyl acetate, in a mixture of 30 percent butyl acetate, 50 percent toluol, 13 percent ethanol (ethyl alcohol) and 7 per cent butanol (which mixture is commonly used as a nitrocellulose solvent), and in hot and cold turpentine. It is soluble in nitrocellulose solvents generally. It was not soluble in mineral spirits, such as V. M. and P. naptha. It dissolved in nitrocellulose solvents and apparently dissolved the nitrocellulose.

The viscosity of the product had risen from W to Z—4+. The reaction was repeated under identical conditions for a time of 6 hours, and it was found that 7.3% maleic anhydride reacted (only 0.3% remained as unreacted maleic anhydride removed by washing). All properties were the same, except that the viscosity was Z—4++. The acid number of the product was 83.2.

*Example 2*

Reaction 1 was repeated using 3 percent of maleic anhydride and a time of 6 hours. The total combined maleic anhydride at the end of the reaction was 2.9 percent; unreacted maleic anhydride was 0.03 percent. Other properties of the product appeared to be the same as in Example 1, but the viscosity of the final product was Z—1.

*Example 3*

The reaction as described in Example 2 was repeated, using a time of 2 and ½ hours. At the end of the reaction the total reacted quantity of maleic anhydride was 2.9 percent, indicating that the 6 hour time used in Example 2 was unnecessarily long in order to obtain substantially complete reaction. The product was identical with that of Example 2.

*Example 4*

Nondehydrated blown castor oil of A grade was reacted with 20 percent of maleic anhydride at 112° to 115° C. for 5 hours under the conditions of Example 1. The total reacted maleic anhydride was 10.4 percent and the viscosity of the final product was Z—6++. The solubilities were the same as those of the product of Example 1.

*Example 5*

Using a flask equipped with an air condenser as in the other experiments, nondehydrated blown castor oil of the B grade (see above table for properties) was reacted with 10 percent of maleic anhydride at 112° to 115° C. for 9 hours. At the end of this period the total reacted maleic anhydride as determined by the increase in acid number was 7.1 percent. All properties of the product appeared to be as indicated in Example 1, except that the original Gardner-Holt viscosity of Z—1 of the B grade castor oil had increased after combining with the maleic anhydride to Z—6.

*Example 6*

Example 5 was repeated, except that the temperature used was 83° to 85° C. and the time was 6 hours. The total reacted maleic anhydride at the end of this period as determined by rise in acid number was 6 percent. The properties of the product appeared to be the same as those in Example 5, except that the final viscosity had risen to Z—5. After 9 hours heating the viscosity was Z—6+, and the total combined maleic anhydride was 5.8 percent.

*Example 7*

In a flask equipped with an air condenser, nondehydrated blown castor oil of C grade (see above table for properties) was reacted with 10 percent of maleic anhydride at 112° to 115° C. for 4 hours, the total reacted maleic anhydride as measured by rise in acid number at the end of the reaction being 7 percent. The viscosity increased from Z—5 to Z—6+, and the other properties of the reaction product appeared to be generally as described in Example 1.

*Example 8*

Example 7 was repeated using 5 percent of maleic anhydride and a time of 6 hours, all other factors remaining the same. The total reacted maleic anhydride in the product as measured by increase in acid number was 4.7 percent. The solubilities and the final viscosity were substantially the same as those of the product of Example 7.

*Example 9*

Using the same apparatus, nondehydrated blown castor oil of D grade (see above table for properties) was reacted with 10 percent maleic anhydride at 112° to 115° C. for one hour. The total reacted maleic anhydride as measured by increase in acid number was 7.0 percent. The viscosity increased from Z—6+ at the beginning of the reaction to Z—6++ at the end of the reaction.

This product showed the same properties and solubilities as those of Examples 1 to 8 inclusive (with exception of the viscosity noted above), except for the fact that unlike the other products of these earlier examples, it was not readily soluble in benzol nor in toluene.

The heating was continued under the conditions of this example for 3 hours, and the product reached the point of gellation.

*Example 10*

Example 9 was repeated using 5 percent of maleic anhydride, with a temperature of 92° to 95° C. and a time of 5 hours. The total reacted maleic anhydride was 3.9 percent as measured by increase in acid number and the product was substantially identical with that obtained in Example 9 after 1 hour heating at the more elevated temperature and with the higher concentration of maleic anhydride, from the standpoints of solubilities and viscosity. It will of course be evident that from the standpoint of acid reactions, the product of Example 10 will not have the capabilities of combining quantities of bases comparable with the product of Example 9.

*Example 11*

As explained, in some cases it may be desirable to blow nondehydrated castor oil partially or wholly during the reaction or subsequent to the reaction with the maleic anhydride. No. 3 raw castor oil of original viscosity T was heated with 10 percent maleic anhydride in a flask equipped with a reflux condenser and an air blowing tube below the level of the oil. At 90° C. the air blowing was started and the temperature was then raised to 108 to 113° C. and blowing with reaction was continued at this temperature for 5 and ½ hours. The total combined maleic anhydride at the end of the reaction was 7.4 percent and 0.2 percent maleic anhydride was recovered unreacted by washing with water. The product appeared to be substantially identical with that of Example 1, and the solubilities were the same, but the viscosity had risen from T to Z+, rather than from W to Z—4+ as in Example 1.

*Example 12*

Example 11 was repeated with blowing at 108 to 113° C. for 10 and ½ hours. The total combined maleic anhydride in the product was 7.1 percent and the amount of uncombined maleic anhydride removed by washing with hot water was 0.15 percent. The properties were substantially the same as in the product of Example 11 except that the viscosity was Z—1.

As a control, No. 3 raw castor oil alone was heated without blowing under the conditions of Examples 11 and 12 for 11 hours. The viscosity increased from T to U only. Another control was heated with blowing as in Examples 11 and 12, also without any maleic anhydride. After 21 and ½ hours blowing at 108 to 113° C. the viscosity had increased only to V, and after 33 and ½ hours it had increased only to W.

It is evident that in Examples 11 and 12 the reaction with the maleic anhydride greatly accelerated the effect of the blowing at the low temperature on the viscosity. It was possible to get a very pronounced effect from blowing at a very much lower temperature than is normally the case without the maleic anhydride. It is evident that the effect of blowing at this low temperature in the absence of maleic anhydride is very slight. The effect is to be ascribed to the blowing in the presence of the reaction product with maleic anhydride.

Example 13

Example 11 was repeated using only 3 percent maleic anhydride and blowing for six hours. The total reacted maleic anhydride in the product was 2.5 percent and the amount which was unreacted and recovered by washing with boiling water was 0.07 percent. It will be noted that the reacting product is stable and unaffected by boiling water. The viscosity increased from T to W.

Example 14

Example 13 was repeated using 10.5 hours blowing. The viscosity went from T to Z. After 13 hours blowing, the viscosity was still Z, and the total reacted maleic anhydride was 2.3 percent. After 25 hours blowing the viscosity was Z—2. After 31 hours blowing the viscosity was still Z—2.

The solubilities of the products of Examples 12 to 14 were the same as those in Example 1.

Comparable products to those of Examples 11 to 14 may be made by blowing after reaction is complete. Blowing temperatures will ordinarily be between about 60 and 150° C. and preferably between 90 and 120° C.

It should be noted that the product of the invention is not in any sense a rubber-like mass. Superficially it resembles the original nondehydrated castor oil in being a clear, yellowish liquid (although in some cases very viscous), and more viscous than the original raw castor oil and also than the corresponding nondehydrated blown castor oil.

It retains its solubility in castor oil, both raw and nondehydrated blown, in cold methyl or ethyl alcohol, and is completely and readily soluble in ether and in hot or cold turpentine.

The product of Examples 1 to 14 is useful as such as a plasticizer, and may with suitable combination be employed as a textile softener, cutting compound, coating, printing ink, finish, or the like, in which the reactivity of the acidic groups of the maleic anhydride can be used to great advantage as explained in the Clocker patents above referred to.

One of the very important features of the invention is that the product is a very desirably improved plasticizer for nitrocellulose, since it is soluble with nitrocellulose, is itself soluble in solvents which dissolve nitrocellulose, and is readily compatible with nitrocellulose.

One of the important features of the invention is the high miscibility with nitrocellulose possessed by the reaction product of nondehydrated blown castor oil with maleic anhydride under the conditions of the invention. The product of the invention can be incorporated in higher proportions than raw castor oil or its corresponding maleic product, and will impart increased hardness to the nitrocellulose films as compared to a similar film plasticized by raw castor oil or its corresponding maleic product. This increased film hardness is not only of value in itself, but the fact that it can be obtained with relatively high proportions of the maleic adduct of nondehydrated blown castor oil is of advantage from the standpoint of economy, since this adduct is cheaper than nitrocellulose and use of high proportions of such adduct in nitrocellulose lacquers or lacquer-enamels is therefore recommended.

It is furthermore of advantage that the maleic adduct of nondehydrated blown castor oil is of higher viscosity than the corresponding blown castor oil and the raw castor oil from which the blown oil was produced, so that use of such adduct rather than the raw or blown castor oil as a nitrocellulose plasticizer provides a convenient way of increasing viscosity.

All of the above features are obtained in nitrocellulose formulations, whether or not the formulation contains pigment. However, there is a special advantage in employing the maleic adduct of nondehydrated blow castor oil of the present invention in formulations where pigment is used, whether they are nitrocellulose formulations or those of other character, because of the superior wetting and improved dispersion of the pigment due to the adduct.

The adduct of the present invention when used as a plasticizer in nitrocellulose lacquers or lacquer-enamels, enables the nitrocellulose to hold a higher pigment concentration, thus giving a film of increased hardness, while at the same time dissolving high contents of nitrocellulose. The adduct will hold markedly higher pigment concentrations than the corresponding nondehydrated blown castor oil, when used in nitrocellulose lacquers or lacquer-enamels.

In the case of certain colors where very high pigment concentration is needed to give satisfactory color characteristics, the use of the adduct of the present invention as a nitrocellulose plasticizer is particularly desirable.

The superior wetting properties and dispersion characteristics for pigment are particularly useful in grinding in pigment for paints and lacquer-enamels, since the production rate of the mill is increased by the quick wetting action and the improved flow characteristics.

Example 15

As an illustration of the improved wetting and dispersion characteristics, various grades of castor oil and various castor oil adducts were mixed with a standard 4 gram sample of Titanox B (the barium compound of titanium dioxide) under the Standard Rub-Out Method described in Chapter 15 of the Examination of Varnishes, Paints, Lacquers and Colors by Henry A. Gardner. The amount of castor oil required to reach the rub-out point in this procedure with raw castor oil was taken as a standard, and the comparative quantities of other grades of castor oil and adducts used to reach the standard rub-out point, and the characteristics of the product at this rub-out point, are noted below.

With raw castor oil, the quantity of oil absorbed at rub-out point was 0.7 gram, and the product may be described as relatively dull in gloss, showing no ready flow on the glass, and rather "dead" in appearance.

Using maleic anhydride 10 percent adduct of raw castor oil as prepared according to my copending application above referred to, the quantity of oil required to reach the rub-out point was 1.3 grams or, with the quantity of oil required in the case of raw castor oil as a standard, 1.9 times the standard. The product is rather glossy and shows only slight flow at the rub-out point.

Using the maleic anhydride 5 percent adduct of raw castor oil according to my copending patent application, the quantity of oil required was 1.6 times the standard, the product was intermediate in gloss between the raw castor oil and its 10 percent maleic adduct, and shows substantially no flow on the plate.

Using nondehydrated blown castor oil of A grade, the quantity of oil was 1.3 times the standard. The product showed some gloss but almost no flow on the plate.

With the 10 percent maleic anhydride adduct of nondehydrated blown castor oil of A grade, according to this invention, the quantity of oil required was 1.9 times the standard. The product shows very high gloss and extremely good flow, covering about 6.5 times the original area with a thin coat under the normal action of gravity, without outside force.

Using the 3 percent maleic anhydride adduct of nondehydrated blown castor oil of A grade according to the present invention, the quantity of oil required was 1.4 times the standard and the product had a very high gloss and spread over about 6 times the original area under the action of gravity with a thin coating, without using outside force.

Using the product of Example 4, the standard rub-out sample required 2.0 times the standard, was of high gloss, and spread over about 6 times the original area under the action of gravity.

Using nondehydrated blown castor oil of B grade, the quantity of oil required was 1.8 times the standard and the product showed good gloss with relatively little flow on the plate.

With the 10 percent maleic anhydride adduct of nondehydrated blown castor oil of B grade in accordance with the present invention, the quantity of oil required was 2.1 times the standard, and the material showed very good flow, spreading automatically over 7 times the original area, and also showing very good gloss.

Using the 3 percent maleic anhydride adduct of nondehydrated blown castor oil of B grade, the quantity required at the rub-out point was 1.57 times the standard. It flowed by itself over about 6.5 times the original area. The gloss was very good.

Using the product obtained according to Example 11, the oil required for the rub-out point was 1.65 times the standard, and the product showed very good gloss but little flow under gravity. Using the product of Example 12, the other facts were the same, but the sample flowed under gravity over about three times the original area.

Using nondehydrated blown castor oil of B grade, four additional drops of the oil beyond the rub-out point produced very little change in flow characteristics. Using the 3 percent maleic anhydride adduct of nondehydrated blown castor oil of B grade, one drop additional of the oil beyond the rub-out point caused the product to flow off the plate.

Using the 3 percent maleic anhydride adduct of No. 3 raw castor oil reacted and blown at 115° C. for 31 hours, it required 1.4 times the standard to reach the rub-out point. There was good gloss and flow occurred over an area 2.3 times the original area.

In summary, it should be noted that the product of the present invention exhibited unusual flow compared with the other products tested and along with very great gloss, whereas the other products were definitely not equal in flow, and were somewhat inferior in gloss. The fact that a relatively large amount of the adduct is required to reach the standard rub-out point is not necessarily disadvantageous since when the rub-out point is reached, the flowability is exceptionally good, and it is not necessary to add additional quantities of the same or other material to improve flow.

It is noted that the above behavior is obtained notwithstanding that the adducts of the present invention are of increased viscosity compared to the other corresponding products tested. The peculiar wetting behavior exhibited in the present invention with pigment appears to be a function not of viscosity, but of another property such as surface tension and inherent wettability, so that in an individual case, as explained above, material of higher viscosity produces greater flowability than material of lower viscosity. While not intending to limit my disclosure, it is believed on the basis of my experiments up to the present time that the carboxyl groups in the adduct of the present invention contribute to this peculiar behavior. This behavior wtih pigment is very important with printing inks, many of which are essentially nitrocellulose lacquer-enamels, where aid in incorporating pigment is very helpful.

It is preferred to use in nitrocellulose formulations pigments which are inert with nitrocellulose. Some pigments, especially of basic character, may on prolonged storage react with nitrocellulose to liberate gas, believed to be an oxide of nitrogen, thus causing distortion or actual bursting of containers. One of the advantages of the adduct of the present invention in nitrocellulose formulations is that it will tend to inhibit both gassing with basic pigments, probably due to the effect of the carboxyl groups.

In some cases resins may be incorporated in nitrocellulose lacquers in which the adduct of the invention is used as a plasticizer. The adduct of the invention is quite satisfactory with conventional resins such as dammar, mastic, pontianak, shellac, ester gum, alkyd, phenol-formaldehyde and urea-formaldehyde.

In some cases where nitrocellulose formulations are used on coated fabrics, the adduct of the invention is desirable as a plasticizer because it tends to increase the spew point or temperature, thus permitting greater stability in extremes of high temperature.

Where colored coatings, plastics, or the like are being formed, the capability of my adduct of combining with basic dyestuffs to develop the color of such dyestuffs and hold them in combination with the adduct is very desirable.

Example 16

A solution of 10 percent of ½ second nitrocellulose in a mixture of ethyl acetate and ethanol (20 percent of ethyl acetate to 80 percent ethanol) was made. A quantity of castor oil product equal to 30 percent of the weight of the solution was added in each of 5 samples, and rhodamine red (basic dyestuff) incorporated with stirring. The film was then spread and allowed to evaporate. The 5 samples contained as the castor oil product respectively raw castor oil, the maleic anhydride 10 percent adduct of raw castor oil, and the products of Examples 1, 2 and 5. The products of Examples 1, 2 and 5 gave superior viscosity characteristics and as compared with the unreacted castor oil, superior development of color.

The Clocker patents listed herein mention many additional basic dyestuffs which give the reaction as indicated in Example 16, and these are incorporated herein by reference without separate listing.

Many other uses may be made of reactions of the acidic adduct of the invention with alcohols, and bases, especially to produce dispersing agents, polishes, textile treating compounds and the like.

Example 17

The 10 percent maleic anhydride adduct of nondehydrated blown castor oil of B grade was reacted with isoamyl alcohol under the following conditions to form a half ester. The adduct was refluxed for ½ hour with 40 percent of its weight of isoamyl alcohol. The initial boiling temperature was about 115° C. and it rose at the end of the heating period to about 140° C.

This isoamyl half ester was then mixed with about 3 times its weight of raw castor oil and the remaining acidic group of the half ester subsequently neutralized with a water solution of potassium hydroxide, with stirring, and then additional quantities of water added to produce a stable emulsion. No tendency in the emulsion to cream was noted after several weeks observation.

This method of mixing the adduct or the half ester of the adduct with the oil to be dispersed and then neutralizing after the mixture with the oil is a general method for making dispersions which is extremely convenient and much more effective than the procedure of mixing the neutralized adduct with the oil to be dispersed.

Instead of potassium hydroxide, any other suitable base may be used, such as ammonium hydroxide, substituted ammonium compounds, sodium hydroxide or amines. All of these are polar reactive compounds which may be used. Examples of substituted ammonium hydroxides which may be employed are: tetra methyl ammonium hydroxide, trimethyl ethyl ammonium hydroxide, and tetra ethyl ammonium hydroxide. Examples of amines which may be used are triethyl amine, trimethyl amine and diethyl methyl amine.

I find that stable emulsions may be made of raw castor oil, nondehydrated blown castor oil, linseed oil, corn oil, olive oil, cotton seed oil and the like using the technique as just described.

The dispersions need not be made by using the half salt-half ester, as they can be accomplished by using the completed salt (the base combining with both carboxyl groups) of the anhydride. However, for a reason not readily apparent, the aliphatic alcohol (carbon chain length in straight or iso-form of not over 7) ester-water soluble salt gives better dispersions than the completed water soluble salt.

Example 18

The isoamyl half ester of the 10 percent maleic anhydride adduct of nondehydrated blown castor oil of B grade was mixed with twice its weight of light petroleum base machine oil. The product was then neutralized with a water solution of potassium hydroxide (5 percent) and a quantity of additional water equal to the weight of adduct and machine oil together was added with suitable stirring. A very stable dispersion was produced which did not cream after several weeks obervation.

Example 19

Using a technique similar to that of Example 18, a dispersion of carnauba wax in water was produced and submitted to microscopic examination. It was found by comparison that the dispersion particle size was the finest obtained with carnauba wax by any process known to the observer. The same procedure may be used to disperse any of the conventional waxes for the purpose of making shoe polishes, dressings, textile finishes, coatings, and the like.

The polar reactive compound which combines with the acidic groups of the adduct may be a mono- or poly-hydric alcohol (including dihydric or tri-hydric), such as methyl, ethyl or propyl alcohol, ethylene glycol, propylene glycol, glycerol, or pentaerythritol. Esters or half esters obtained with any of these alcohols exhibit a configuration suggesting an alkyd of a new type, since the alcohol is coupled to the carbon chain of the fatty acid through the maleic group. These esters may be used as resin ingredients, plasticizers or softeners, and are considered to have special advantage in the lacquer and varnish field.

A very desirable feature of the compound formed by heating the adduct of the present invention with glycerol is that the viscosity of the resultant product, suitably a softener, can be controlled with great accuracy and over a wide range by varying the time of reaction of the nondehydrated blown castor oil adduct with the glycerol from a minimum of about 1 hour to a maximum of 40 hours or more at a temperature range of from about 100 to 180° C. preferably about 105 to 120° C.

Example 20

After three hours heating of glycerol with the adduct of Example 1 at 110° C. the resulting compound, although highly viscous, was still readily soluble in cold methyl or ethyl alcohol. It is thus possible to obtain close control on viscosity of a lacquer or plasticizer while insuring flexibility in the resultant film. The concentration of glycerol is preferably between ½ and 2 mols of glycerol per mol of adduct, 1 and ½ mols of glycerol being most desirable.

In esterification, the temperature used may in some cases be as high as 180° C. but for many reactions 110° C. is sufficient. In one example using the 10 percent maleic anhydride adduct of nondehydrated blown castor oil, very satisfactory combination with glycerol in the proportion of ⅔ mol of glycerol to 1 mol of adduct was obtained after 15 hours stirring in a flask.

In some cases advantage may desirably be taken of combining with the adduct a metal or salt of a metal such as metallic manganese, cobalt, iron, copper, vanadium, magnesium, aluminum, or the oxide, carbonate or acetate thereof. These may be combined with the adduct especially to form an ingredient for coatings, such as linoleum.

From the behavior of the adduct of the present invention in its various reactions, it appears that in the initial reaction the maleic anhydride has coupled with the carbon chain of the fatty acid of the nondehydrated blown castor oil, suitably at a double bond, without neutralizing the acidic groups of the maleic anhydride. It should be noted that the increase in the acid number largely accounts for the maleic anhydride which combines and which cannot be removed by washing. It should be emphasized therefore that the reaction is very evidently not alkyd formation by the maleic anhydride and the nondehydrated castor oil.

It will be evident that the nondehydrated blown reaction product may be made by carrying on the reaction with maleic anhydride after, during or before the blowing.

In view of my invention and disclosure variations and modifications to meet individual whim or particular need will doubtless become evident to others skilled in the art, to obtain all or part of the benefits of my invention without copying the product and process shown, and I, therefore, claim all such insofar as they fall within the reasonable spirit and scope of my claims.

Having thus described my invention, what I claim as new and desire to secure by Letters Patent is:

1. The process of modifying nondehydrated blown castor oil, which comprises reacting blown castor oil having the hydroxyl groups characteristic of the raw oil with from 2 to 20 percent of maleic anhydride, and terminating the treatment, at between 70° and 140° C. in the substantial absence of other reactants for at least one hour.

2. The process of modifying nondehydrated blown castor oil, which comprises reacting blown castor oil having the hydroxyl groups characteristic of the raw oil with from 3 to 15 percent of maleic anhydride at between 95° and 140° C. for from one to 12 hours in the absence of other reactants.

3. The process of modifying nondehydrated blown castor oil, which comprises reacting blown castor oil having the hydroxyl groups characteristic of the raw oil with 10 percent of maleic anhydride at between 95° and 140° C. for at least one hour.

4. The process of modifying nondehydrated blown castor oil, which comprises reacting blown castor oil having the hydroxyl groups characteristic of the raw oil with from 2 to 20 percent of maleic anhydride at between 70° and 140° C. in the substantial absence of other reactants for at least one hour, and subsequently reacting the modified oil with a substance of base-reacting character with which the acidic groups combine.

5. The process of modifying nondehydrated blown castor oil, which comprises reacting blown castor oil having the hydroxyl groups characteristic of the raw oil with from 2 to 20 percent of maleic anhydride at between 95° and 140° C. for at least one hour, and neutralizing the reaction product with an ammonium base.

6. The process of modifying nondehydrated blown castor oil, which comprises reacting blown castor oil having the hydroxyl groups characteristic of the raw oil with from 2 to 20 percent of maleic anhydride at between 95° and 140° C. for at least one hour, and esterifying the reaction product with an alcohol.

7. A modified castor oil in viscous liquid form, comprising blown castor oil still containing the hydroxyl groups characteristic of the raw oil combined at a temperature of between 70° and 140° C. after reaction for at least one hour with from 2 to 20 percent of maleic anhydride, soluble in nondehydrated blown castor oil, readily soluble in cold turpentine, soluble in ethyl alcohol, soluble in nitrocellulose solvents, soluble in water solution of alkali and insoluble in mineral spirits.

8. A modified castor oil consisting of the reaction product of blown castor oil still retaining the hydroxyl groups characteristic of raw castor oil and from 2 to 20 percent maleic anhydride reacted together at from 70° to 140° C. for at least one hour, and esterified by an aliphatic alcohol of carbon chain length not over seven.

9. A modified castor oil consisting of the reaction product of blown castor oil still retaining the hydroxyl groups characteristic of raw castor oil and from 2 to 20 percent maleic anhydride reacted together at from 70° to 140° C. for at least one hour, and esterified by glycerol.

10. A nitrocellulose formulation comprising nitrocellulose and a plasticizing amount of the reaction product of blown castor oil having the hydroxyl groups characteristic of the raw oil and from 2 to 20 percent of maleic anhydride reacted at a temperature of 70° to 140° C. for at least one hour, the reaction product being insoluble in mineral spirits.

11. A nitrocellulose formulation comprising nitrocellulose, a pigment and a plasticizing amount of the reaction product of blown castor oil having the hydroxyl groups characteristic of the raw oil and from 2 to 20 percent of maleic anhydride reacted at a temperature of 70° to 140° C. for at least one hour, the reaction product being insoluble in mineral spirits.

HARRY M. ULLMANN.

REFERENCES CITED

The following references are of record in the file of this patent:

UNITED STATES PATENTS

| Number | Name | Date |
|---|---|---|
| 2,058,597 | Koenig | Oct. 27, 1936 |
| 2,188,882 | Clocker | Jan. 30, 1940 |
| 2,188,883 | Clocker | Jan. 30, 1940 |
| 2,196,135 | Wolf et al. | Apr. 2, 1940 |
| 2,275,843 | Clocker | Mar. 10, 1942 |

FOREIGN PATENTS

| Number | Country | Date |
|---|---|---|
| 405,805 | Great Britain | Feb. 15, 1934 |

OTHER REFERENCES

Lewkowitsch, "Chemical Technology and Analysis of Oils, Fats and Waxes" (1914), vol. II pages 396 and 397.